No. 12,533. REISSUED SEPT. 18, 1906.

S. OTIS.

DUMP CAR.

APPLICATION FILED NOV. 1, 1905.

3 SHEETS—SHEET 1.

Witnesses:

Chas. E. Gaylord.

John Endres.

Inventor:

Spencer Otis,

Thomas F. Sheridan,

Atty.

No. 12,533.

REISSUED SEPT. 18, 1906.

S. OTIS.

DUMP CAR.

APPLICATION FILED NOV. 1, 1905.

3 SHEETS—SHEET 2.

Witnesses:

Geo. E. Gayford.

John Enders.

Inventor:

Spencer Otis,

By Thomas F. Sheridan,

Atty.

No. 12,533. REISSUED SEPT. 18, 1906.

S. OTIS.

DUMP CAR.

APPLICATION FILED NOV. 1, 1905.

3 SHEETS—SHEET 3.

Witnesses:
Chas. E. Taylor.
John Enders

Inventor:
Spencer Otis,
By Thomas F. Sheridan,
Atty.

UNITED STATES PATENT OFFICE.

SPENCER OTIS, OF CHICAGO, ILLINOIS, ASSIGNOR, BY MESNE ASSIGNMENTS, TO NATIONAL DUMP CAR COMPANY, A CORPORATION OF MAINE.

DUMP-CAR.

No. 12,533. Specification of Reissued Letters Patent. Reissued Sept. 18, 1906.

Original No. 767,657, dated August 16, 1904. Application for reissue filed November 1, 1905. Serial No. 285,495.

*To all whom it may concern:*

Be it known that I, SPENCER OTIS, a citizen of the United States, residing at Chicago, in the county of Cook and State of Illinois, have invented certain new and useful Improvements in Dump-Cars, of which the following is a specification.

The invention relates to that class of dump-cars which are provided with a drop-bottom portion formed of a plurality of swinging sections, and particularly to the means by which the swinging sections are opened and closed, all of which will more fully hereinafter appear.

The principal object of the invention is to provide a dump-car having a drop-bottom portion with simple, economical, and efficient opening and closing mechanism.

Other and further objects of the invention will appear from an examination of the drawings and the following description and claims.

The invention consists principally in a dump-car in which there are combined a drop-bottom portion formed of a plurality of swinging sections pivotally secured to the car at each side of the longitudinal center, a sliding bar arranged so as to contact the lower portions of such doors to open and close the same, a rock-shaft connected with such sliding-bar mechanism, and gear mechanism for rotating such rock-shaft.

The invention consists, further and finally, in the features, combinations, and details of construction hereinafter described and claimed.

Figure 1:
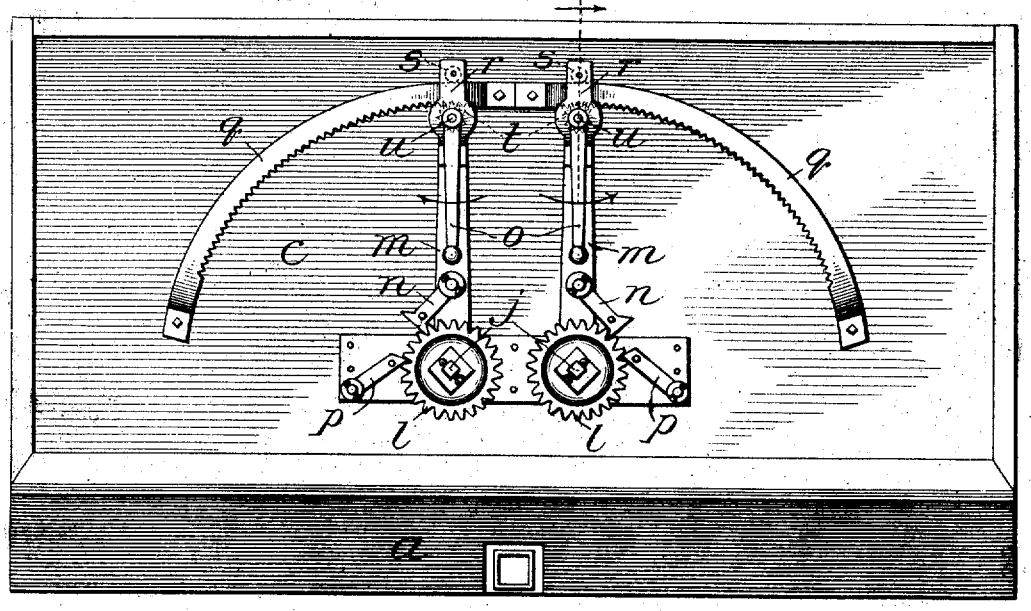
Figure 2:
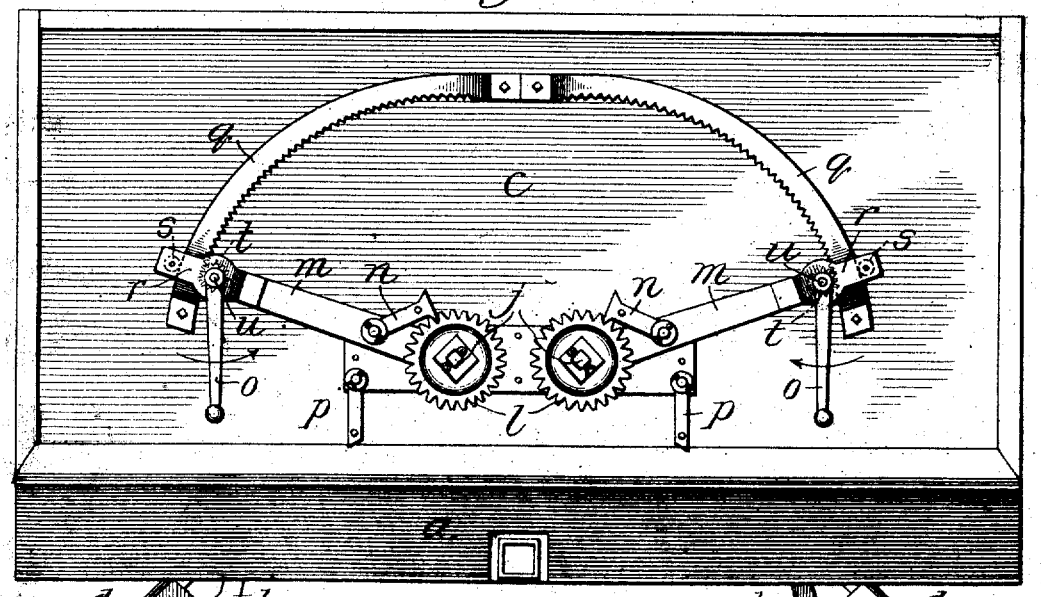
Figure 3:
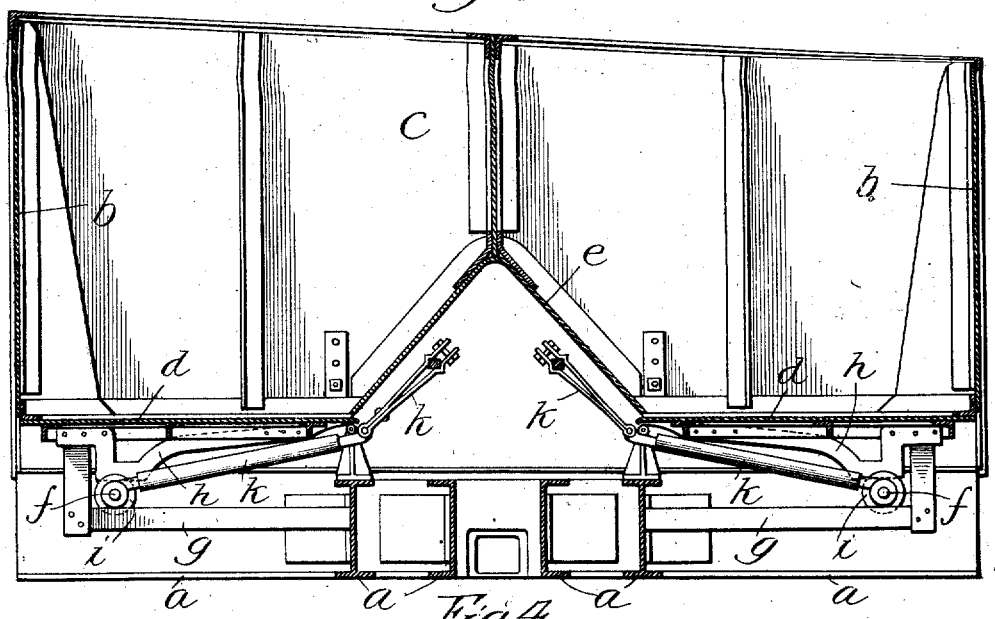
Figure 4:
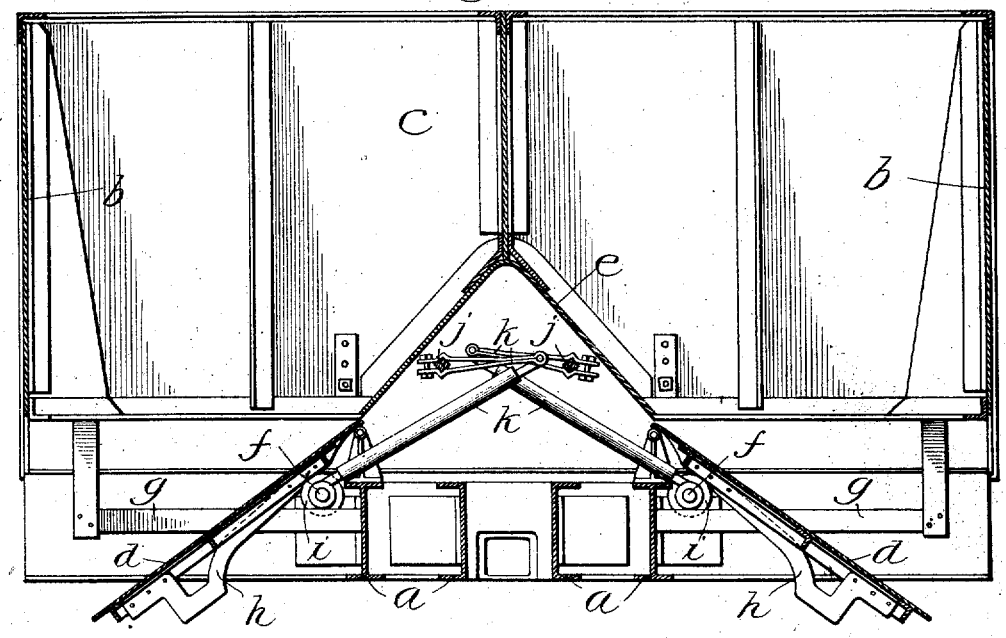
Figure 5:
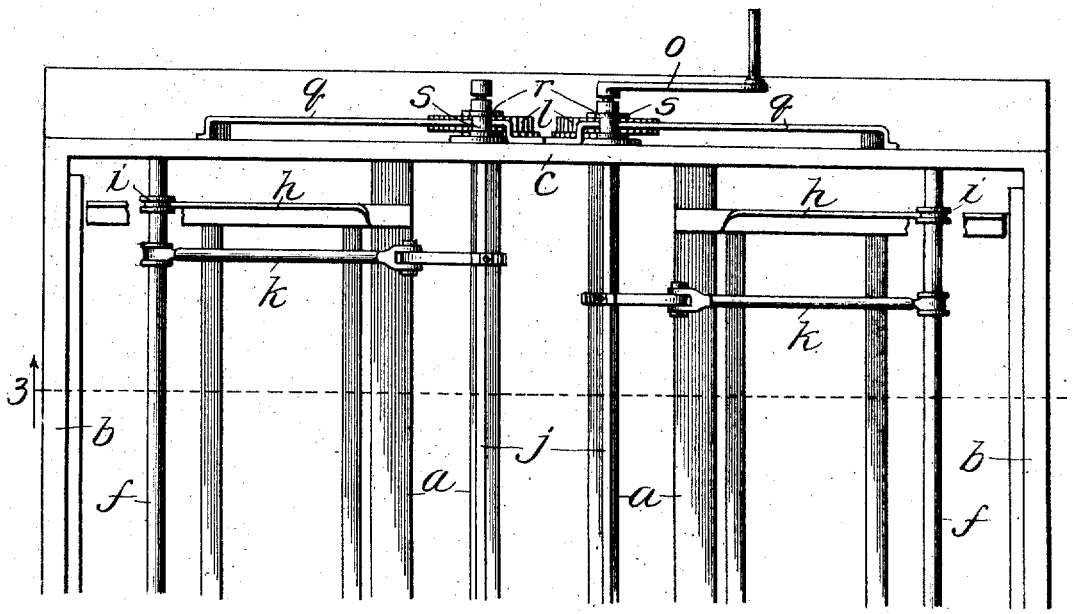
Figure 6:
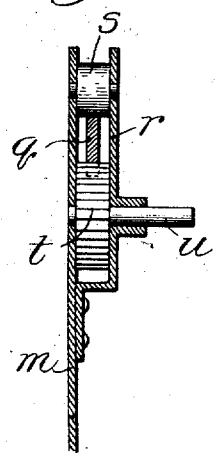

In the accompanying drawings, Figure 1 is an end view of one type of car as it appears when constructed in accordance with these improvements, showing the drop-bottom mechanism in closed position, as shown in Fig. 3; Fig. 2, a similar view showing the operating-lever and other mechanism in position to open the drop-door mechanism, as shown in Fig. 4; Fig. 3, a cross-sectional elevation of a portion of the car, showing the drop-door mechanism in closed position and taken on line 3 of Fig. 5 looking in the direction of the arrow; Fig. 4, a similar view showing the drop-door mechanism in open or dumping position; Fig. 5, a plan view of one end of the car as it appears when constructed in accordance with these improvements looking at it from above and with the parts removed to show the sliding bar and attached mechanisms; and Fig. 6 an enlarged sectional detail taken on line 6 of Fig. 1 looking in the direction of the arrow.

In constructing a dump-car in accordance with these improvements I make a supporting-framework *a* of any desired or usual construction and which is preferably provided with upwardly-extending side boards *b* and end boards *c*. This type of car is provided with what is known as a "drop-bottom" portion formed of a plurality of swinging sections *d*, pivotally secured at their inner edges to the framework of the car at each side of the longitudinal center. In this type of car I prefer to use a central A-shaped section *e*, which acts as a housing for the rock-shaft and other mechanisms hereinafter described and to assist in dumping or discharging the entire load of the car to either or both sides of the track. To open and close these swinging bottom-sections, slide-bar mechanism *f* is provided and slidingly mounted upon track mechanism *g*, so that they may reciprocate backwardly and forwardly, or, more properly speaking, inwardly and outwardly, to open and close the drop-bottom swinging sections. Each of these swinging bottom-sections is provided with a cam portion *h*, secured to the bottom portion and formed of wrought-iron, and is of such arrangement that it may be contacted by the antifriction-wheels *i* on said sliding-bar mechanism to close the doors, as shown particularly in Fig. 3. To reciprocate these sliding bars inwardly and outwardly, rock-shaft mechanisms *j j* are provided, having their bearing portions in the framework of the car. These rock-shaft mechanisms are provided with compound link mechanisms *k*, pivotally secured together and connected with the sliding-bar mechanism, so that as such rock-shaft mechanisms rotate in one direction or the other they reciprocate the sliding-bar mechanisms. To operate these rock-shaft mechanisms in an efficient manner, and thus permit the parts to be locked against ordinary displacement and rotated as desired, such rock-shafts are provided with ratchet-wheels *l* and operating-levers *m*, loosely mounted thereon and adjacent to the ratchet-wheels. These operating-levers are provided with pawls *n n*, pivotally secured thereto, so that they may be swung to either side to rotate such ratchet-wheels, and thereby the rock-shafts, in either direction. Dog mechanisms *p* are provided and arranged to engage the ratchet-wheels when the parts are in the position shown in Fig. 6 and hold the rock-shafts against rotation, and thereby the swinging bottom-sections in closed position. To provide means for moving these operating-levers as desired, segmental racks *q* are provided, and the upper ends of the operating-levers are bifurcated, as at *r*, so as to straddle or span the segmental-rack mechanisms, as shown particularly in Fig. 6. These bifurcated yokes or bracket portions of the operating-levers are provided with antifriction-rolls *s*, engaging the upper smooth surface of the segmental racks, and with rotatable pinions *t*, engaging the toothed surface of such racks. The shafts *u*, upon which these rotating pinions are mounted, are provided with cranks and handles *o*, by which such pinions are rotated and the operating-lever moved backwardly or downwardly, as desired.

In operation, assuming the parts to be in the position shown in Fig. 1, the dogs *p* are knocked out of engagement with the ratchet-wheels and the crank-handles rotated in the direction of the arrows, so that the rotation of the pinions causes the lever-arms to be swung outwardly and downwardly, thereby rotating the rock-shafts and operating the sliding-bar mechanism from the position shown in Fig. 3 to that shown in Fig. 4, all of which permits the swinging bottom-sections to drop into open or discharging position. It will be observed that when the doors are in closed position and the operating-levers in the position shown in Fig. 1 and it is desired to open the doors the cranks *o* are rotated and the lever is swung in a downward direction, causing the pinions *l* to rotate through the pawls *n*. When the lever has swung for a short distance to the downward direction, the rollers *i* on the arms *k* will be drawn from under the horizontal portion of the cams *h* and will then ride on the inclined portion of such cams. When the rollers reach the inclined portion of the cams, the weight of the material on the doors will force the doors downwardly, thus causing the rock-shafts *j j* and the ratchet-wheels *l l* to rotate, the teeth of the ratchet dragging over the pawl *n*, the lever *m*, owing to its loose connection with the shaft, remaining stationary. It will be seen, therefore, that it is unnecessary to turn the levers *m* down to their lowest position, as shown in Fig. 2, in opening the doors. When it is desired to close the doors, the levers are carried down to the position shown in Fig. 2, the pawl *n* swung over to engage the ratchet-wheel, as shown, and the pinions *u* rotated to turn the ratchet-wheel and shaft, thereby raising the doors. It will be further observed that I have provided means for inducing the initiatory movement of the parts and thereafter to permit such movement to be automatically completed without manual assistance or without compelling the person operating the mechanism to be subjected to violent or sudden jerks as the mechanism proceeds in its path of travel. To close the drop-door mechanism, the pawls are swung over to the position shown in Fig. 2 and the crank-handles rotated in the direction of the arrows in such figure, all of which moves the operating-levers upwardly and inwardly to the position shown in Fig. 1 and the parts from the position shown in Fig. 4 to that shown in Fig. 3. The dogs *p* may be again thrown into engagement with the ratchet-wheels to prevent the easy unlocking of the parts and the opening of the swinging bottom-sections, all of which will be understood and appreciated by those skilled in the art.

In illustrating and describing these improvements I have only illustrated and described that which I consider to be new, taken in connection with so much as is old as will properly disclose the invention to others and enable those skilled in the art to practice the same, leaving out of consideration other and well-known elements, which if set forth herein would only tend to confusion, prolixity, and ambiguity.

I claim—

1. In a dump-car of the class described, the combination of a drop-bottom portion formed of a plurality of swinging sections pivotally secured to the car at each side of the longitudinal center, a sliding bar arranged so as to contact the lower portions of such doors to open and close the same, a rock-shaft connected with such sliding-bar mechanism, and gear mechanism for rotating such rock-shaft, substantially as described.

2. In a dump-car of the class described, the combination of a supporting-framework, a drop-bottom portion formed of a plurality of swinging sections pivotally secured thereto at each side of the longitudinal center, sliding-bar mechanism for opening and closing such swinging sections, rock-shaft mechanism connected with such sliding-bar mechanism to operate the same, lever mechanism on such rock-shaft mechanism, and gear mechanism for operating such lever mechanism to rotate the rock-shaft and thereby open and close the drop-bottom swinging sections, substantially as described.

3. In a dump-car of the class described, the combination of a supporting-frame portion, a drop-bottom portion formed of a plurality of swinging sections pivotally secured thereto at each side of the longitudinal center, sliding-bar mechanism for opening and closing such swinging sections, rock-shaft mechanism connected with such sliding-bar mechanism to operate the same, operating-lever mechanism secured to such rock-shaft mechanism, segmental-rack mechanism secured to the frame of the car, and pinion mechanism on the operating-lever mechanism engaging with such rack, substantially as described.

4. In a dump-car of the class described, the combination of a supporting-framework, a drop-bottom therefor formed of a plurality of swinging sections pivotally secured thereto and at each side of the longitudinal center, sliding-bar mechanism for opening and closing such swinging sections, rock-shaft mechanism connected with such sliding-bar mechanism, ratchet-wheel mechanism on such rock-shaft mechanism, operating-lever mechanism loosely mounted on such rock-shaft mechanism and provided with pawl mechanism to engage such rock-shaft and operated in a different direction, and gear mechanism for moving the operating-lever mechanism, substantially as described.

5. In a dump-car of the class described, the combination of a supporting-framework, a drop-bottom therefor formed of a plurality of swinging sections pivotally secured at their inner edges to each side of the longitudinal center of such supporting-framework, sliding-bar mechanism for opening and closing such swinging bottom-sections, rock-shaft mechanism provided with compound connecting-link mechanism connected with the sliding-bar mechanism, ratchet-wheel mechanism secured to the rock-shaft mechanism, operating-lever mechanism loosely mounted on the rock-shaft mechanism and provided with pawl mechanism engaging the ratchet-wheel mechanism, segmental-rack mechanism secured to the framework of the car adjacent to the operating-lever mechanism, and pinion mechanism on such operating-lever mechanism engaging the rack mechanism, substantially as described.

6. In a dump-car of the class described, the combination of a supporting-framework, a drop-bottom portion formed of a plurality of swinging sections pivotally secured thereto in each side of the longitudinal center, sliding-bar mechanism for opening and closing such swinging bottom-sections, rock-shaft mechanism, compound link mechanism connecting the rock-shaft with the sliding-bar mechanism, ratchet-wheel mechanism on the rock-shaft mechanism, operating-lever mechanism loosely mounted on the rock-shaft mechanism and provided with pawl mechanism in engagement therewith to rotate the ratchet-wheel mechanism in either direction, segmental-rack mechanism attached to the framework of the car, a bifurcated yoke on the end of the operating-lever mechanism straddling the segmental rack and provided with an antifriction-roll in engagement therewith so as to hold such operating-lever mechanism in operative position, and a pinion mounted in such bifurcated yoke or bracket in engagement with the segmental rack to move such operating-lever mechanism, substantially as described.

7. In a hopper-door-operating mechanism, the combination with door-operating mechanisms and an operating-shaft therefor of means for initiating the movement of said shaft, which means after the shaft is initially moved remain inoperative.

SPENCER OTIS.

Witnesses:
ANNA L. SAVOIE,
JENNIE A. MACEDWARD.